C. ERB.
SAFETY STARTING CRANK.
APPLICATION FILED SEPT. 7, 1921.
1,430,064.
Patented Sept. 26, 1922.
2 SHEETS—SHEET 2.
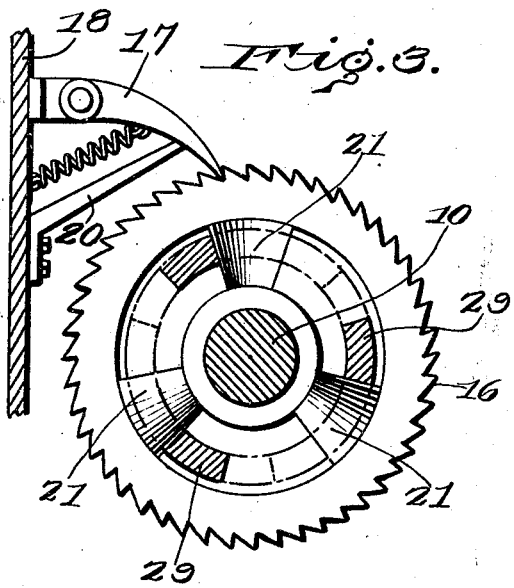
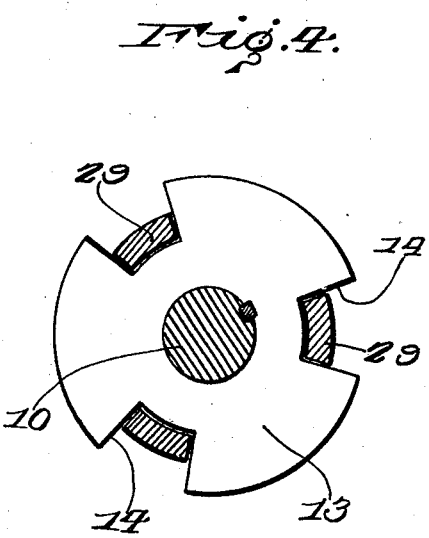
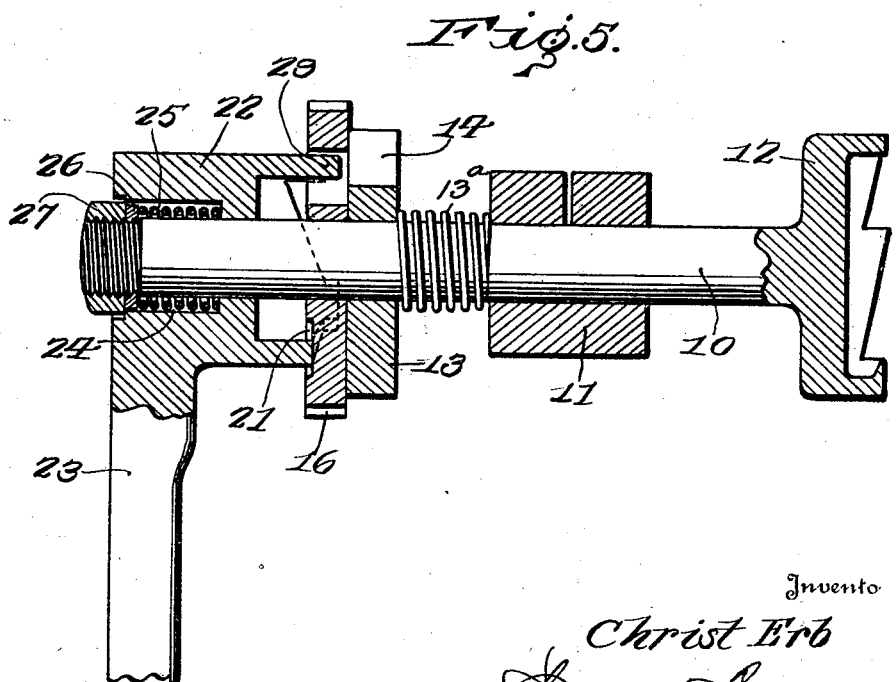
Inventor
Christ Erb
By
Attorneys Patented Sept. 26, 1922.

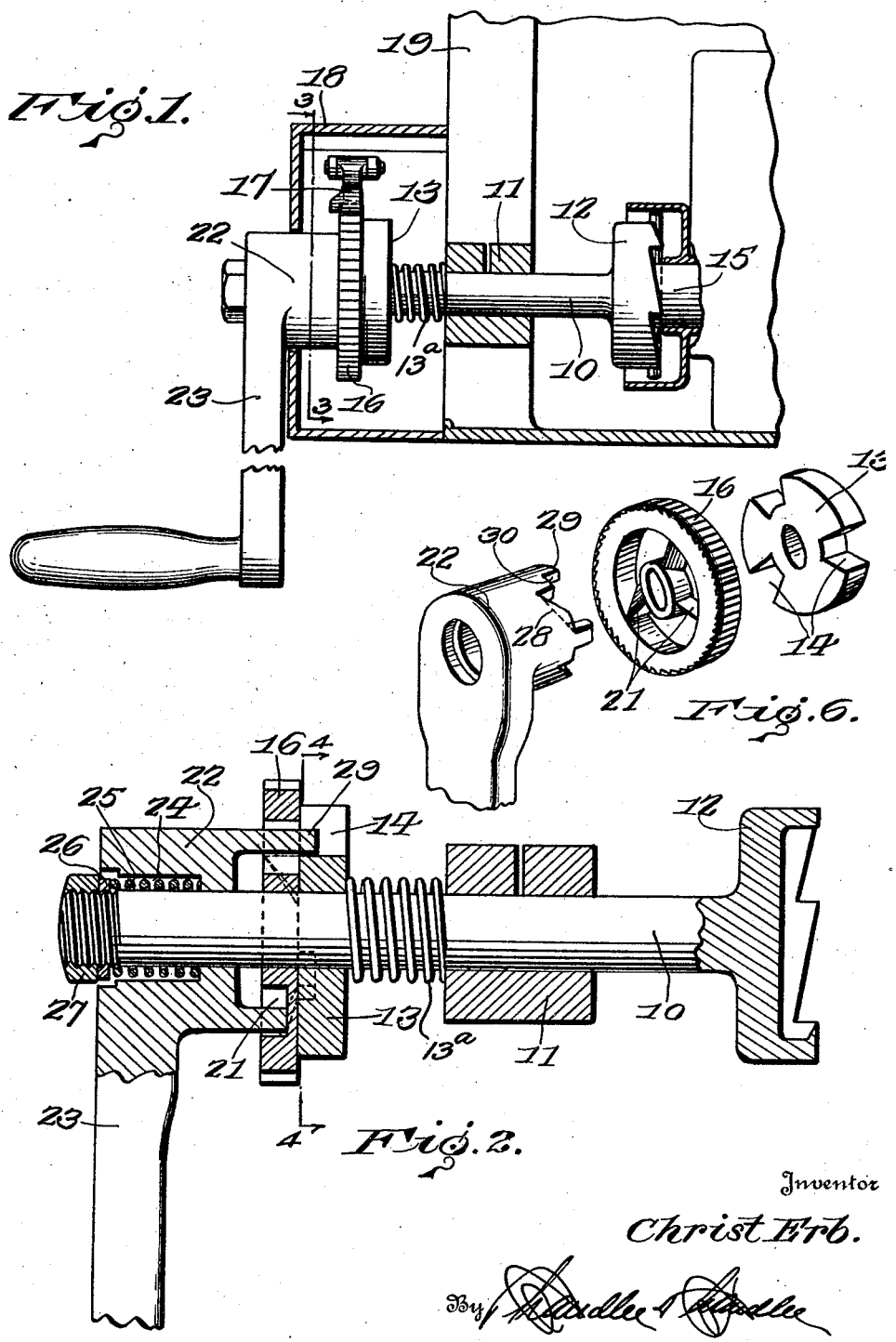
C. ERB.
SAFETY STARTING CRANK.
APPLICATION FILED SEPT. 7, 1921.
1,430,064. Patented Sept. 26, 1922.

1,430,064

UNITED STATES PATENT OFFICE.

CHRIST ERB, OF BELLEVILLE, WISCONSIN.

SAFETY STARTING CRANK.

Application filed September 7, 1921. Serial No. 499,023.

*To all whom it may concern:*

Be it known that I, CHRIST ERB, a citizen of the United States, residing at Belleville, in the county of Dane, State of Wisconsin, have invented certain new and useful Improvements in Safety Starting Cranks; and I do hereby declare the following to be a full, clear, and exact description of the invention, such as will enable others skilled in the art to which it appertains to make and use the same.

This invention relates to new and useful improvements in safety devices and particularly to safety devices for use in connection with the starting cranks of automobile engines.

One object of the invention is to provide a device of this character which is simple in construction, safe and positive in its action, and which can be easily and quickly applied to automobiles now in use without radical modifications thereto.

Another object is to provide a device of this character which will render the crank stationary in the hand of the operator when the engine back-fires.

A further object is to provide a device of this character which, after the engine has back-fired, will automatically restore itself to normal condition for another safety operation.

Other objects and advantages will be apparent from the following description when taken in connection with the accompanying drawing.

In the drawing:

Figure 1 is a side elevation of the parts, with fragments of the automobile shown in connection therewith.

Figure 2 is a vertical longitudinal central sectional view through the device.

Figure 3 is a vertical transverse sectional view on the line 3—3 of Figure 1, showing the ratchet wheel in front elevation.

Figure 4 is a vertical transverse sectional view on the line 4—4 of Figure 2, showing the notched disk in elevation.

Figure 5 is a vertical longitudinal sectional view similar to that of Figure 2, but with the parts in the positions assumed when the engine has back-fired.

Fig. 6 is a view in perspective of the clutching parts, separated.

Referring particularly to the accompanying drawings, 10 represents the stem of the crank which is rotatably supported in the block 11 and has the ratchet clutch head 12 on one end. Keyed on the stem 10, outwardly of the block 11, is a disk 13 having in its periphery a plurality of regularly spaced notches 14 extending inwardly from the periphery thereof. Encircling the stem 10, and bearing with its ends against the block 11 and the disk 13, is a coil spring $13^a$ which normally urges the stem outwardly to disengage its clutch end from the engine shaft 15. Loosely disposed on the stem 10, outwardly of the disk 13, and in close proximity thereto, is a ratchet wheel 16, the teeth of which are engaged by a pivoted spring pressed pawl 17, mounted on one side wall of the casing 18, which is carried by the lower portion of the radiator 19, of the automobile. Also carried by the said side wall of the casing 18, is an upwardly inclined finger 20 which engages beneath the pawl to prevent the pawl from binding in the teeth of the ratchet wheel, and to prevent the pawl from dropping below a predetermined position. The ratchet wheel 16 includes the spokes 21, each of which has its outer face beveled in a lateral direction.

Engaged on the outer end of the stem 10 is the hub portion 22 of the crank 23. In the outer end of the hub portion 22 there is formed a recess 24, through which extends the outer end of the stem 10, and in which is disposed the coil spring 25, said spring encircling the said end of the stem. A washer 26 and a nut 27 are engaged on the outer end of the stem to maintain the spring within the recess. The inner end of the hub portion 22 is formed with a plurality of inclined faces 28 and the straight lugs 29, extending longitudinally outward from the outer ends of said inclined faces.

When the parts are assembled, as clearly seen in Figure 2, the inclined faces 28 bear against the inclined faces of the spokes 21 of the ratchet wheel 16, while the lugs 29 extend into the notches 14 of the disk 13.

To operate the device, the crank is grasped and pushed inwardly until the clutch end engages with the engine shaft, when the crank is rotated, in the usual manner. The lugs 29, by reason of their engagement in the notches of the disk, will rotate the stem 10, while the shoulders 30, of the hub portion 22, will bear against the thicker edge portions of the spokes, and rotate the ratchet wheel. When the engine back-fires, the engine shaft will rotate in the opposite direction with great force, and will, by the clutching engagement of the stem with the shaft, cause the stem to suddenly rotate backwards. When the engine shaft and stem 10 rotate backwardly the disk 13, by its engagement with the lugs 29, of the hub 22, will rotate the hub backwardly, also, with the result that the inclined faces of the hub will ride on the inclined faces of the spokes, causing the hub to be driven outwardly longitudinally of the stem, and against the spring 25. This rotary movement of the hub and crank will be so slight that the person holding the crank will hardly realize that the motion has been made, the crank remaining loosely in his hand, and without damage to him.

What is claimed is:

1. In a cranking device for an automobile engine, a stem having a clutch head on one end, a disk keyed on the stem and rotatable therewith, a ratchet wheel loosely mounted on the stem close to the disk and having a plurality of transversely inclined spokes, the periphery of the disk being formed with a plurality of notches, and a crank hub loosely mounted on the stem and having projecting inclined faces and lugs, the said inclined faces extending into engagement with the faces of the spokes, the said lugs extending through the spaces between the spokes and into the notches in the disk, and a spring for holding the lugs and faces in yieldable engagement.

2. A safety starting crank mechanism including a clutch stem, a handle resiliently urged longitudinally on the stem, a member loosely rotatable on the stem and normally engaged by the handle, a member fixed on the stem and normally engaged by the handle, and means for preventing rotation of the loose member in one direction.

3. A safety starting crank mechanism including a clutch stem, an apertured member loosely rotatable on the stem, a peripherally notched member fixed on the stem, an operating member on the stem and spring urged into engagement with the notched member through the loose member, and means for preventing rotation of the loose member in one direction.

4. A safety starting crank mechanism including a clutch stem, a peripherally notched disk fixed on the stem, a loose peripherally toothed disk on the stem having bevel-walled openings therethrough, and a crank handle on the stem having beveled projections disposed through the said openings and engaging in the peripheral notches of the first-named disk.

In testimony whereof, I affix my signature, in the presence of two witnesses.

CHRIST ERB.

Witnesses:
JACOB S. URBEN,
J. JACOB HOFTZ.